United States Patent [19]

Norton et al.

[11] Patent Number: 4,459,071
[45] Date of Patent: Jul. 10, 1984

[54] SOLIDS FLOW REGULATOR

[75] Inventors: Richard C. Norton, Boston; Paul E. Koppel, Lexington, both of Mass.

[73] Assignee: Stone & Webster Engineering Corp., Boston, Mass.

[21] Appl. No.: 342,393

[22] Filed: Jan. 25, 1982

[51] Int. Cl.³ .............................................. B65G 53/50
[52] U.S. Cl. .................................. 406/108; 122/4 D; 406/127; 406/146; 414/217
[58] Field of Search ....................... 406/12, 14, 29, 30, 406/108, 122, 127, 144, 146, 191, 192, 194; 222/61, 637; 122/4 D; 414/217; 110/245; 431/7, 170; 165/104.16

[56] References Cited

U.S. PATENT DOCUMENTS

| | | | |
|---|---|---|---|
| 2,623,793 | 12/1952 | Hill | 406/14 |
| 2,684,869 | 7/1954 | Lapple | 222/637 |
| 2,726,137 | 12/1955 | Davis, Jr. | 406/122 X |
| 2,880,170 | 3/1959 | Savoca et al. | 414/217 X |
| 4,240,377 | 12/1980 | Johnson | 122/4 D |

FOREIGN PATENT DOCUMENTS 1300935  12/1972  United Kingdom ................ 406/108

Primary Examiner—Jeffrey V. Nase
Attorney, Agent, or Firm—Hedman, Gibson, Costigan & Hoare

[57] ABSTRACT

An apparatus to serve as a valve to regulate the flow of particulate solids, from an upstream to a downstream location. The valve relies on pressure differential rather than moving mechanical parts. A plenum adjacent a chamber designed to accommodate a slumped mass of particulate solids receives fluid pressure and transmits the pressure to the slumped mass to move the particulate solids through an opening to a downstream location.

2 Claims, 5 Drawing Figures

SOLIDS FLOW REGULATOR

FIELD OF THE INVENTION

This invention relates generally to valve mechanisms. More particularly, the invention relates to a valve mechanism for the control and regulation of particulate solids.

BACKGROUND OF THE INVENTION

Description of the Prior Art

Currently, there are many applications in industry where particulate solids are used. Further, additional uses for particulate solids are regularly being found.

Chemical processing and steam generation are among the industries that have beneficially used particulate solids, both catalytic and inert, as means for accomplishing hydrocarbon cracking and heat transfer. Therein, very high temperatures (above 1500° F.) and high mass flow of the particulate solids are experienced. Thus, problems result when flow regulation of the particulate solids is attemped by the use of mechanical valves. The high temperature environment and high mass flow cause deterioration of the moving parts and prevent full positive movement of the closure members.

Various non-mechanical means have been developed for the regulation of flow of particulate solids. U.S. Pat. No. 2,541,662 (Palmer, 1951) discloses a system in which air regulated by a conventional mechanical valve is used to accelerate or decelerate the flow of catalytic particles from a cracking reactor to a fractionator.

Regulated transfer of granular solids has also been provided by the use of a controlled pressure gradient across a seal leg. This mechanism is described in U.S. Pat. No. 4,078,675 (Woinsky; 1978) wherein the seal leg extends between vessels at different pressures and is provided with a plurality of gas conduits arranged to insure local pressurization at various points along the seal leg. The system is directed to affording uniform flow through the seal leg without creation of a fluidized condition.

Very recently, a system has been disclosed for regulated flow of particulate solids relying on a combination of carrier gas and metering gas. Solids discharging from a feed hopper are carried downstream by the carrier gas. The metering gas enters a plenum chamber in the system between the feed hopper and the carrier gas line to meter solids delivery to the carrier gas line. The system also includes a line to equalize the pressure above the solids in the feed hopper to the metering gas pressure in the plenum chamber. The system is described in Institute of Gas Technology Annual Report—June 1977, Project No. 8976.

SUMMARY OF THE INVENTION

It is the basic objective of this invention to provide a valve to regulate the flow of particulate solids.

It is a further object of this invention to provide valve means for particulate solids flow which valve means has no moving mechanical parts.

It is another object of this invention to provide a valve for particulate solids that is particularly suitable for operation in a high mass flow, high temperature environment.

Accordingly, the present invention is comprised of a valve mechanism and process arranged to operate by producing variable pressure differentials in a solids flow line between the upstream and downstream ends of the valve.

Structurally, a standpipe is located between an upstream source of particulate solids and the downstream passage into which the particulate solids pass. A chamber for pressurized fluid is arranged in communication with the standpipe at a location near the bottom of the standpipe. The standpipe terminates in a configuration adapted to accommodate a slumped mass of particulate solids.

A fluid medium, inherently suitable for pressurization, occupies the chamber for pressurized fluid and, in response to an external pressure source, imposes a pressure at the chamber opening on the material in the standpipe. This pressure operates directly on the slumped mass of particulate solids at the bottom of the standpipe.

In the operation of the valve, the imposition of a higher pressure at the chamber standpipe opening and, axiomatically on the slumped mass, than in the downstream passage will cause the particulate solids to move downstream. A lower (or equal) pressure at the chamber standpipe opening than in the downstream passage will decrease or interrupt the flow of particulate solids.

DESCRIPTION OF THE DRAWINGS

The invention may be better understood when considered in view of the following drawings wherein.

DESCRIPTION OF THE PREFERRED EMBODIMENT

Figures 1, 2:
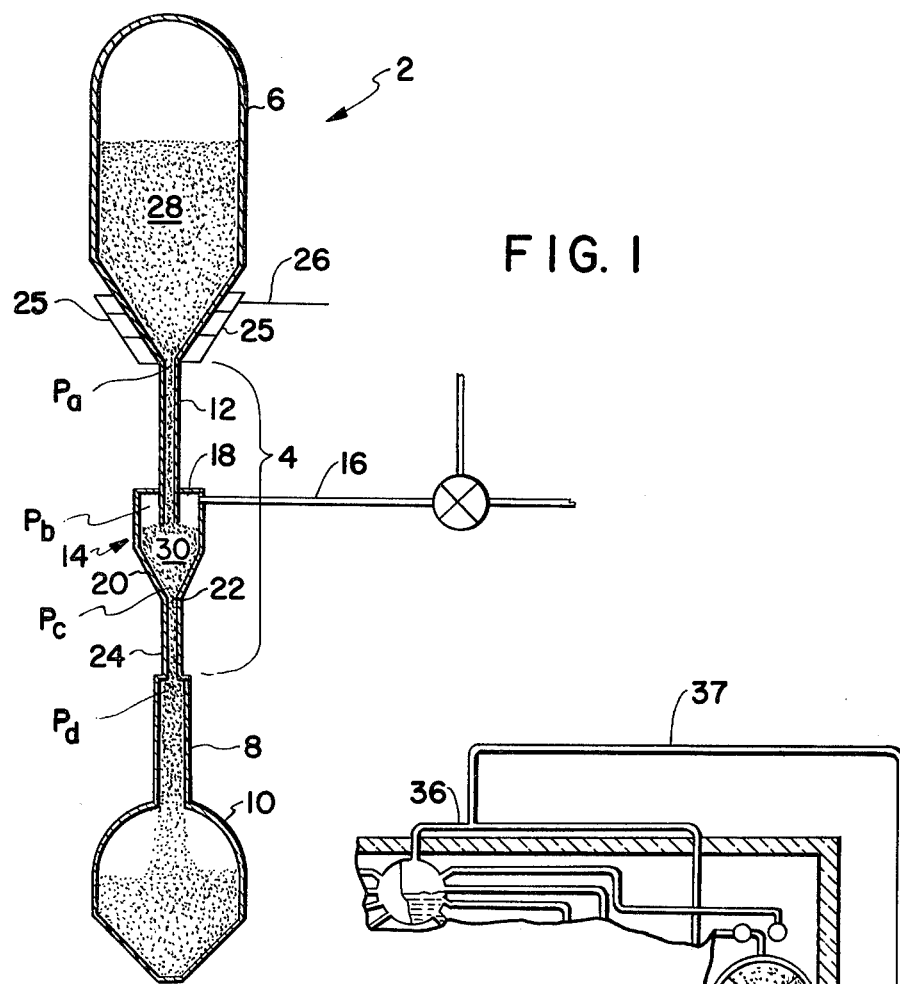
FIG. 1 is essentially a schematic system for the flow of particulate solids in which the valve of the invention is included.
FIG. 2 is a partial cross-sectional view of the valve of the invention in a fluidized bed furnace.

The valve of the present invention is suitable for use in virtually every application wherein regulated flow of particulate solids is desirable. In FIG. 1, the valve is shown in a very general solids flow environment.

The system 2 of FIG. 1 is comprised of the valve assembly 4, a solids reservoir 6, the solids use system 8 and a final solids reservoir 10.

The valve 4 is comprised specifically of a supply standpipe 12, a control hopper 14 and a line 16 for the delivery of a medium under pressure to the control hopper 14. The control hopper 14 is shown with an upper plenum chamber 18, a convergent section 20 and a restricted discharge orifice 22. In the embodiment of FIG. 1, a flow tube 24 is shown extending from the restricted orifice 22 to the solids use system 8.

The solids reservoir 6 contains a fluidized bed 28 and is provided with fluidization manifolds 25 and a delivery line 26 for fluidization gas.

The valve assembly 4 functions to regulate the flow of particulate solids from the solids reservoir 6 to the solids user 8. Control of the particulate solids flow is effected by varying the pressure in the plenum chamber 18 to regulate the flow of particulate solids through the restricted orifice 22 and flow tube 24 in a range above gravity flow.

The valve 4 regulates flow of particulate solids by virtue of producing pressure differentials between the upstream and downstream side of the valve 4. As seen in FIG. 1, the pressure $P_a$ at the top of the standpipe 12 is at the upstream end of the valve and the pressure $P_d$ at the entry of the solids user 8 is at the downstream end of the valve 4. Flow into the solids user 8 occurs when the pressure $P_d$ is lower than the pressure $P_c$ immediately upstream of the entry to the solids user 8. In FIG. 1, the orifice 22 immediately upstream of the entry to the solids use system 8 is separated by the flow tube 24. However, in many applications, the orifice 22 will be the discharge point for delivery to a solids user 8. Functionally, the pressure difference between $P_c$ and $P_d$; i.e., the pressure differential across the orifice 22, determines flow through the orifice 22. Thus, when the pressure $P_c$ is greater than the pressure $P_d$, flow of particulate solids will increase through the orifice 22 and, accordingly, through any other associated passage such as a flow tube 24.

In the arrangement wherein solids gravity flow tends to continue with $P_c$ equal to $P_d$, reduction to shut-off of solids flow can be attained with counterflow of air through the solids discharge orifice 22.

The valve 4 operates to regulate the pressure difference between $P_c$ and $P_d$ by the imposition of pressure $P_b$ in the plenum 18.

The function of the control hopper 14 is to regulate the rate of flow of solids through the outlet restriction 22 by establishing the appropriate difference in pressure between $P_c$ and $P_d$ through control of pressure $P_b$ above the slumped bed 30. Solids flow to the control hopper 14 is via the standpipe 12, the flow from which is limited by closure of its outlet by the free surface of the slumped bed 30 in the control hopper 14. This assures constant slumped bed level in the control hopper 14. The pressure difference between the top of the standpipe $P_a$ and the control hopper $P_b$ results in a permeated flow of gas or vapor from high to low pressure without interferring with the regulated downflow of solids, provided the outlet of the standpipe is not fluidized.

The control hopper pressure $P_b$ is regulated independently of the standpipe inlet pressure $P_a$ in the course of controlling the desired solids flow rate. The rate of solids flow is a major function of the pressure difference maintained between $P_c$ and $P_d$ and a minor function of the flow of entrained gas or vapor within the solids. The latter is established in the standpipe 12 as a function of the inlet pressure $P_a$ and the outlet pressure $P_b$ and remains in equilibrium with pressure $P_b$ in passing through the control hopper 14 to the flow outlet restriction 22.

The embodiment of FIG. 2 shows the valve 4 of the invention in a fluidized bed boiler 32. The fluidized bed boiler 32 of FIG. 2 is shown and described in detail in U.S. Pat. No. 4,240,377. The furnace boiler 32 as shown in FIG. 2, includes a fluidized bed 28, an upward flow chamber 34 for recirculation of particulate solids and the necessary steam lines 36. The valve 4 is shown in the solids upflow line 34 to regulate the flow of particulate solids between the fluidized bed 28 and the upflow passage 34. The standpipe 12 of the valve 4 is shown extending from the floor of the furnace on which the fluidized bed 28 is supported and terminating in an opening 22 to the upflow passage 34. The plenum chamber 18 of the valve is offset and communicates with the standpipe 12 in an opening 38 at a location near the bottom of the standpipe 12. The standpipe is filled with solids and the particulate solids between the opening 38 and the orifice 22 are, in effect, a slumped bed 30 through which pressure from the plenum chamber is exerted to regulate the pressure $P_c$ immediately upstream of the orifice 22.

The valve 4 can be regulated by sensing the steam conditions in a steam line 36. A line 37 is shown illustratively, extending from a steam line 36 to the valve 39 in the pressure line 16 to control the valve 39 as a function of the steam conditions. The valve 39 and the sensing means to control the valve 39 are conventional.

Figure 3:
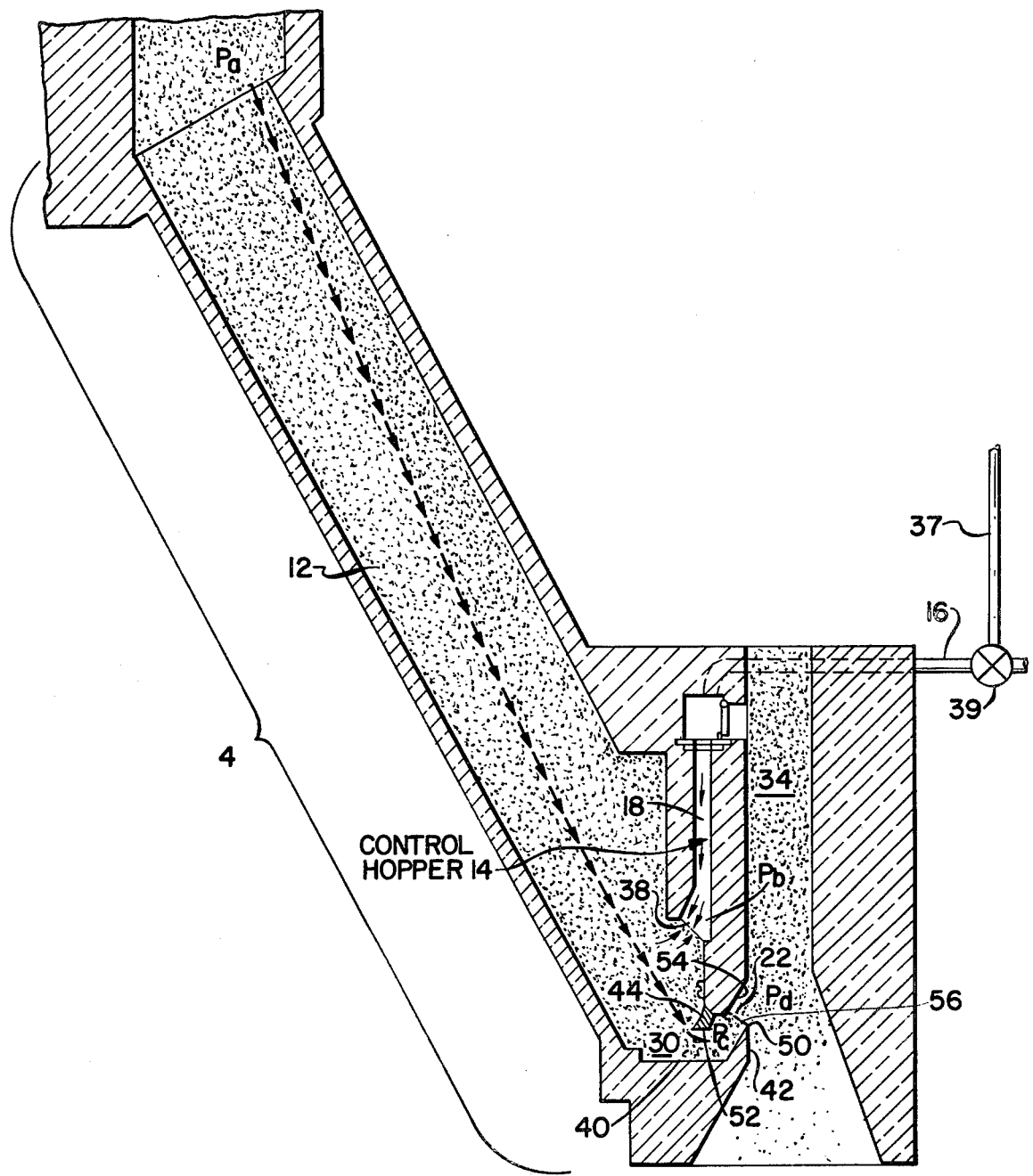
FIG. 3 is a cross-sectional elevational view of the valve of the invention in the open mode.
Figure 4:
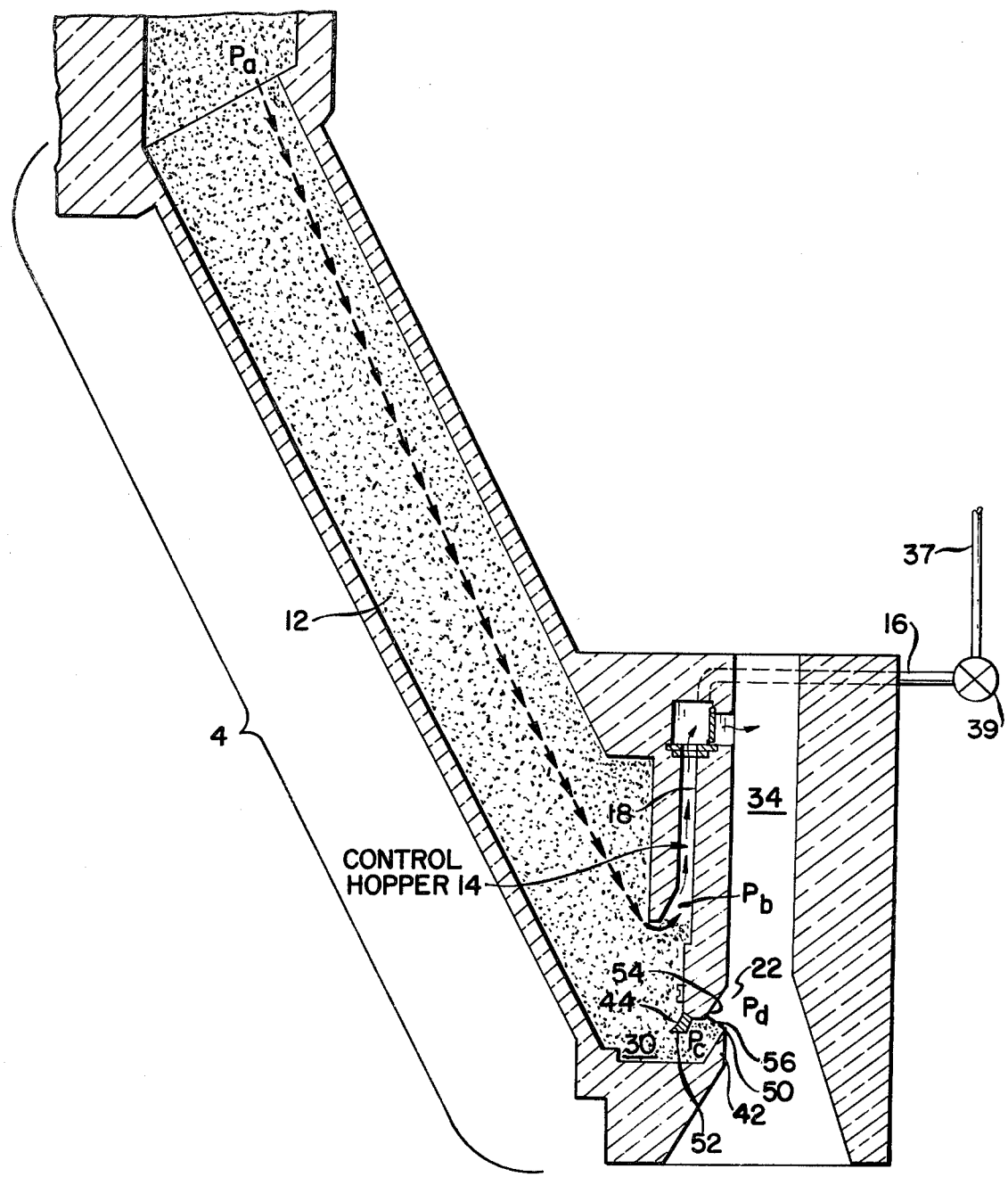
FIG. 4 is the cross-sectional view of FIG. 3 with the valve in the closed mode.

The valve of FIG. 2 is shown in the flow mode in FIG. 3 and in the interrupted mode in FIG. 4.

As seen in FIG. 3, the valve 4 is comprised of the standpipe 12, the plenum chamber 18, and the orifice 22 with a section 40 configured to insure repose of a slumped bed 30. In practice, it has been found that the point of communication 38 between the plenum chamber 18 and the standpipe 12 must be at the bottom of the standpipe 12. This arrangement enables the standpipe 12, by virtue of its finite length, to provide an effective pressure seal between the pressure in the fluidized bed 28 (pressure $P_a$) and the pressure $P_c$ immediately upstream of the orifice 22. In practice, it has been found that particulate solids such as fused alumina spheres, having a particle size of 50–400 microns can effectively seal a pressure of 20 inches W.G. at the base of the fluidized bed from the orifice if it is 13 inches in length and if the opening 38 from the plenum chamber 18 is located 10 inches from the base of the fluidized bed.

As further seen in FIGS. 3 and 4, a lip 42 is provided immediately upstream of the orifice 22 to afford a structure capable of effecting complete shut-off with a control pressure $P_b$, in the plenum chamber 18, a small increment greater than $P_d$. Lip 42 can be omitted if the minimum control pressure increment greater than $P_d$ is an objective. The assembly also includes moveable means in the form of a moveable curtain 44 that operates to limit or prevent the horizontal gravity flow of solids over the floor of the discharge opening by positioning the natural angle of repose of the surface sloping from the curtain. In practice, it has been found that location of the top 50 of lip 42 at an elevation essentially the same as the bottom surface 52 of curtain 44 will provide a structure that affords complete shut-off when the pressure $P_c$ is equal to or lower than the pressure $P_d$.

In a practical embodiment of the valve 4, it has been found that with the lip 42, an opening 5/16" as measured from point 50 to the surface 54 along line 56 with a 2" width will afford flow for a correspondingly sized 2 inch by 1 inch circulation system of a fluidized bed. Under conditions wherein the pressure at the base of the fluidized bed $P_a$ is equal to 25 inches W.G. and the pressure $P_d$ in the upflow column 34 ranges from 0 to 25 W.G., flow of the particulate solids through opening 22 could be controlled from 0 to 20 kilograms per minute with pressure differentials ranging from 0 to 10 inches W.G.

It is also an aspect of the invention to afford very wide slot-type openings at the orifice 22. The control hopper must be essentially the same length as any slot used in place of the orifice 22. With such an arrangement, uniform distribution at high mass flow is realized.

Figure 5:
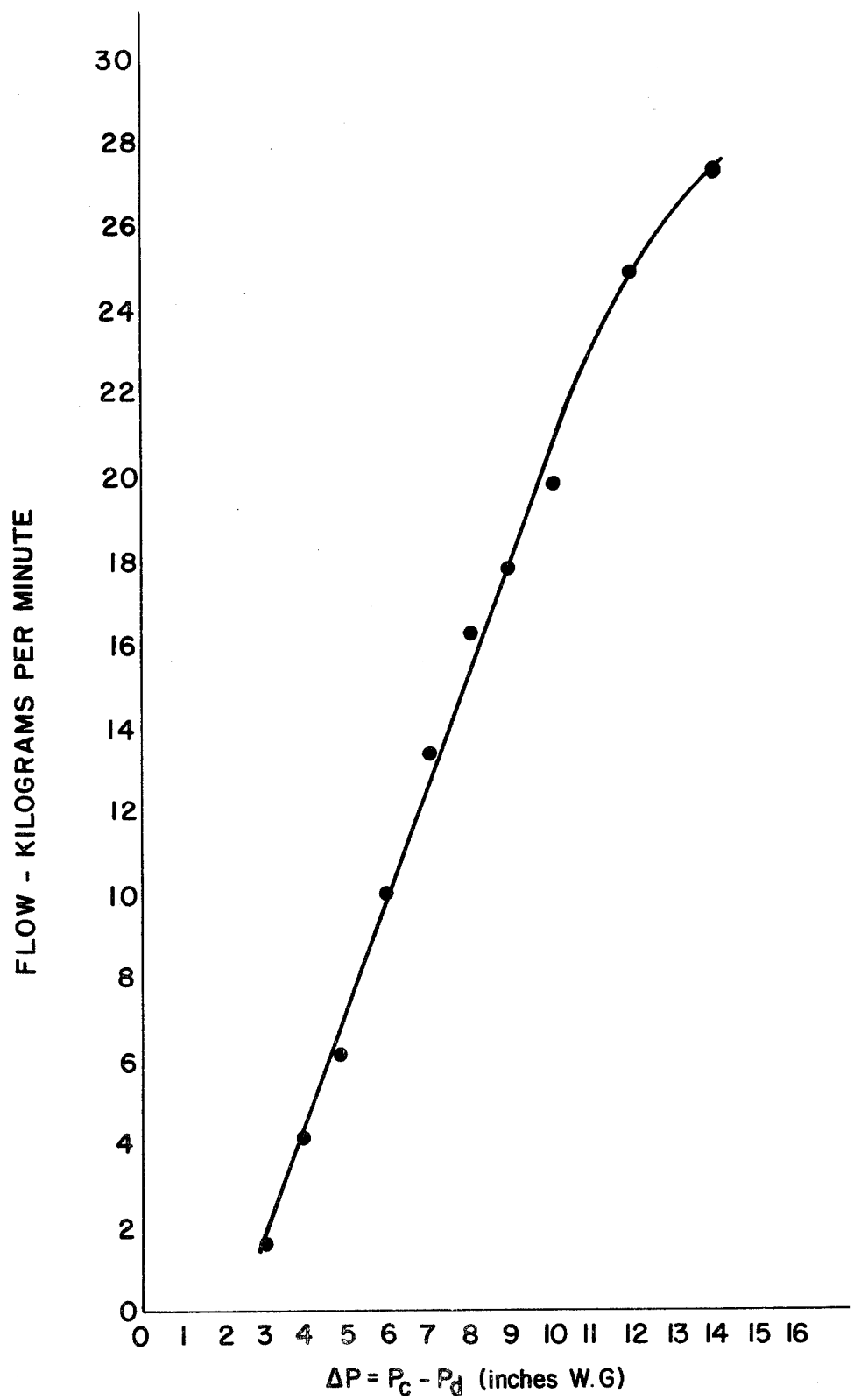
FIG. 5 is a graph plotting particulate solids flow through the valve as a function of pressure difference across the valve configuration shown in FIGS. 2, 3 and 4.

The graph of FIG. 5 shows the solids flow through the 5/16" discharge opening of the embodiment of FIGS. 2, 3 and 4 as a function of the pressure differentials between $P_d$ and $P_c$. As can be seen from the graph, when the pressure differential between $P_d$ and $P_c$ attains a threshold pressure of 3 inches W.G., the flow starts at a rate less than 2 kg. per minute. Flow increases linearly with pressure differential about 10 fold. As additional flow increases, in this case, above about 20 inches W.G., the increase in solids flow ceases to increase linearly thus, an aeration phenomenon begins to limit the flow. In effect, the mixture of particulate solids and air is reduced in density. At sufficiently high pressure differentials, the solid flow diminishes.

Solids flow for any environment will follow essentially the profile of FIG. 5. However, the initial pressure differential at which flow occurs may vary depending on the configuration of the valve. For example, in the embodiment of FIG. 1, flow will occur at a 0 pressure differential between $P_c$ and $P_d$ by virtue of gravity flow. The creation of higher pressure differentials between $P_c$ and $P_d$ for the embodiment of FIG. 1 will then produce a higher mass flow as a function of the pressure differential.

The operation of the valve 4 of FIGS. 3 and 4 is essentially the same as the operation of the valve 4 of FIG. 1. In FIG. 1, the pressure $P_a$ at the base of the fluidized bed is sealed from the slumped bed 30 by the standpipe 12. Thus, by increasing the pressure $P_b$ in plenum chamber 18 of control hopper 14, applied to slumped bed 30, such pressure will in turn increase the pressure $P_c$. When pressure $P_c$ is elevated above the pressure $P_d$, flow through the orifice 22 will increase. When the pressure in the plenum chamber 18 is reduced, the pressure $P_b$ decreases and in turn the pressure $P_c$ is reduced. When the pressure $P_c$ decreases to a value equal to the pressure $P_d$, flow of particulate solids through the orifice 22 will be reduced to a rate due to acceleration of gravity.

What is claimed is:

1. A valve for regulating flow of particulate solids from an upstream location to a downstream location comprising:
    (a) an opening to the downstream location;
    (b) a standpipe between the upstream location and the opening to the downstream location which provides a passage for the flow of particulate solids from the upstream location to the downstream opening and seals the pressure at the upstream location from the opening to the downstream location;
    (c) a chamber at the opening to the downstream location to confine a slumped mass of particulate solids, said chamber having a lower surface below the bottom of the opening to the downstream location and a surface extending downwardly and inwardly from the top of the opening to the downstream location, which downward and inward extension extend below the elevation of the bottom of the opening to the downstream location;
    (d) a regulatable fluid pressure source;
    (e) a plenum chamber in communication with the regulatable pressure source, said plenum chamber having an opening at the bottom of the standpipe directly above the slumped mass; and
    (f) means to deliver fluid pressure through the plenum chamber to the slumped mass of particulate solids immediately upstream of the downstream opening, whereby delivery of fluid pressure to the slumped mass of particulate solids causes passage of the particulate solids through the opening to the downstream location.

2. A valve as in claim 1 wherein the standpipe provides communication between a fluidized bed operating at temperatures above 1500° F. and a recirculation upflow chamber arranged to return particulate solids from the bed back to the bed.

* * * * *